United States Patent [19]
Mizobe

[11] Patent Number: 5,249,104
[45] Date of Patent: Sep. 28, 1993

[54] OPTICAL DISPLAY DEVICE

[76] Inventor: Tatsuji Mizobe, 1-21-3 Sugano, Ichikawa-shi, Chiba-ken, Japan

[21] Appl. No.: 810,421

[22] Filed: Dec. 20, 1991

Related U.S. Application Data

[63] Continuation-in-part of Ser. No. 547,163, Jul. 3, 1990, abandoned.

[51] Int. Cl.⁵ .............................................. G09F 13/00
[52] U.S. Cl. ..................................... 362/31; 362/833; 362/330; 362/800; 362/806; 362/812; 362/327; 40/556; 40/546
[58] Field of Search ............... 362/31, 83.3, 330, 800, 362/812, 806, 245, 327, 328, 23; 40/556, 442, 546, 547

[56] References Cited

U.S. PATENT DOCUMENTS

| | | | |
|---|---|---|---|
| 3,491,245 | 1/1970 | Hardesty | 362/26 |
| 4,229,783 | 10/1980 | Eberhardt | 362/23 |
| 4,321,655 | 3/1982 | Bourrande | 362/23 |
| 4,903,171 | 2/1990 | Livezay et al. | 362/31 |
| 4,965,950 | 10/1990 | Yamada | 362/31 |
| 4,977,695 | 12/1990 | Armbruster | 40/556 |
| 5,046,826 | 9/1991 | Iwamoto et al. | 362/31 |
| 5,057,974 | 10/1991 | Mizobe | 362/331 |

Primary Examiner—Ira S. Lazarus
Assistant Examiner—L. Heyman
Attorney, Agent, or Firm—Cushman, Darby & Cushman

[57] ABSTRACT

An optical display device such as an emblem mounted on an automotive vehicle is disclosed which is simple in structure and displays a display pattern in a silver metallic color by daylight. The interior of the device is kept invisible in the daytime, whereas the pattern is displayed in any desired color in a uniform manner in the nighttime.

2 Claims, 3 Drawing Sheets

OPTICAL DISPLAY DEVICE

This application is a continuation-in-part of application Ser. No. 07/547,163 filed on Jul. 3, 1990.

BACKGROUND OF THE INVENTION

1. Field of the Invention

The present invention relates to an optical display device which can exhibit a display pattern not only by daylight but also an internal light source in the nighttime. More particularly, it relates to an optical display device in which a display pattern is visible in the daytime but an internal instrument is not visible and which device can exhibit the display pattern in a visible manner by uniform light having any desired color in the nighttime.

DESCRIPTION OF THE PRIOR ART

In general, in the display device such as an emblem or the like mounted on a body of an automotive vehicle, the display pattern is visible in the daytime. There are some display devices in which even internal instruments may be observed in the daytime and the display patterns are displayed by the internal light source within the internal instruments in the nighttime. However, in almost all the display devices, the light emitted from the display devices would be non-uniform. In some of the conventional devices, it is possible to make uniform the emitted light but their structures are complicated, and the size of the devices are large. Thus, the conventional devices are still unsatisfactory.

The present applicants have proposed a variety of improvements in addition to the technique shown in U.S. Pat. No. 5,057,974. The former application filed prior to the filing of the present applicant discloses a prior art technique which is most relevant to the present invention. The former application will be described.

FIG. 5 is a vertical cross-sectional view of the device, and FIG. 6 is a plan view of the device. The optical display device C is constructed as follows.

Reference numeral 2 denotes a printed circuit board, and reference numeral 3 denotes light sources such as light emitting diodes (LEDs) mounted on the printed circuit board 2. Reference numeral 4 denotes a light reflective plate such as a reflective sheet or a reflective layer coated plate mounted on a top surface of the printed circuit board 2 except for portions of the printed circuit board on which the light sources 3 are mounted. Coating material having a high light transmissive characteristic is applied to the light reflective plate 4. Reference numeral 5 denotes a light transmissive member made of transparent material such as acrylic resin, having a high transmissive characteristic, through which the light from the light sources 3 passes. The light transmissive member is slightly spaced upwardly away from the printed circuit board 2. A plurality of cavities 6 into which the light sources 3 are inserted are formed at positions corresponding to the light source mounted positions. Reference numeral 7 denotes a light transmissive box-like member formed of transparent material such as acrylic resin having a desired color. The box-like member is provided so as to cover a front face and side surfaces of the light transmissive member 5 and side surfaces of the printed circuit board. Light non-transmissive members 9 made of coated layers or plated films are applied to a top surface of the box-like member 7 except for portions on which a desired pattern 8 such as a letter or a figure is marked. In the thus constructed conventional optical display device C, when the light sources 3 are turned on by supplying current to the printed circuit board 2, the light from the light sources 3 is introduced into the light transmissive member 5 and is advanced through the member 5. A part of the light is reflected by the light reflective plate 4 as reflective light and is caused to pass through the light transmissive member 5. The light which has reached the upper portion of the light transmissive member 5 passes through the box-like member 7 and passes through the display portion 8 which forms the pattern. The light is emitted to the outside from the display portion 8 to thereby display the pattern such as a letter or a figure. By forming the transparent box-like member 7 and the transmissive member 5 of acrylic resin colored in a desired color, it is possible to select the emission light color of the pattern as desired with a decorative effect. However, the display device suffers from the following defects:

(1) When the light from the light sources 3 passes through the transmissive member 5, since the light is reflected by the reflective plate located at the bottom, the light reflectivity is low, and it is impossible to make the thickness of the transmissive member 5 less than a predetermined level. As a result, it is impossible to reduce the overall thickness of the light display device C as a whole.

(2) Since the light from the light sources 3 is emitted directly from the display portion 8 or the light reflected light from the reflective plate 4 is emitted from the display portion 8, the light of the display portion 8 is not uniform and would flicker, which is undesirable in an outer appearance.

(3) There is a fear that sunshine would be introduced into the interior of the transmissive member 5 in the daytime and the interior of the instruments such as light sources 3 and printed circuit board 2 would be visible from the outside.

(4) In order to color the light emission display, the colored acrylic plate or the like is used. The light absorption amount through the plate is large. Not only would the amount of emission light from the display portion be reduced, but also the number of colors and the kind of colors would be restricted. As a result, it is impossible to obtain a desired bright display.

SUMMARY OF THE INVENTION

In view of the above-noted defects, a primary object of the invention is to provide an optical display device which is simple in structure and which provides a decreased thickness of the display portion while assuring a uniform and bright light display. The internal instruments of the device are not visible from the outside in the daytime, and it is possible to use any desired color for display.

In order to achieve this and other objects, according to the present invention, there is provided an optical display device comprising: a printed circuit board; light sources mounted on the printed circuit board; a light transmissive member having at a bottom a light reflective surface for reflecting light upwardly, cavities into which the light sources are inserted being formed in the light transmissive member, the light transmissive member being made of light transmissive material; a light dispersing plate provided on an upper surface side of the light transmissive member for dispersing light from the light sources; a color sheet provided on an upper surface side of the light dispersing plate for keeping the interior of the optical display device invisible from the outside and for selecting a desired color for the light emitted from the device; a half mirror provided on an upper surface side of the color sheet for serving as a silver metallic mirror surface in the daytime and for passing the light from the inside in the night time; and a light display member made of light transmissive material marked displaying pattern thereon and provided on an upper surface side of the half mirror for displaying a predetermined pattern such as a predetermined letter or figure and for covering the peripheral portions of the printed circuit board, light transmissive member, light dispersing plate and half mirror. A light dispersing function is imparted to an upper surface of said light transmissive member to thereby dispense with said light dispersing plate.

With such an arrangement, the light from the light sources such as LEDs is introduced directly into the light transmissive member or after the light is reflected at the reflective surface of the bottom of the light transmissive member with a high reflectivity, the light is introduced into the light transmissive member. The light is advanced toward the upper surface side of the light transmissive member. The light which has reached the upper surface of the light transmissive member is diffused by the dispersing film to become a uniform light (gentle and stable light). Also, it is possible to color the light emitted through the half mirror and the display portion to the outside to exhibit a predetermined pattern of sign, letters and figures. Also, since the half mirror plate is provided immediately below the display portion, it is possible to reflect sunshine by the surface of the half mirror in the daytime to highlight the pattern in a mirror surface of silver metal.

DESCRIPTION OF THE PREFERRED EMBODIMENTS

The present invention will now be described with reference to the accompanying drawings.

Figure 5:
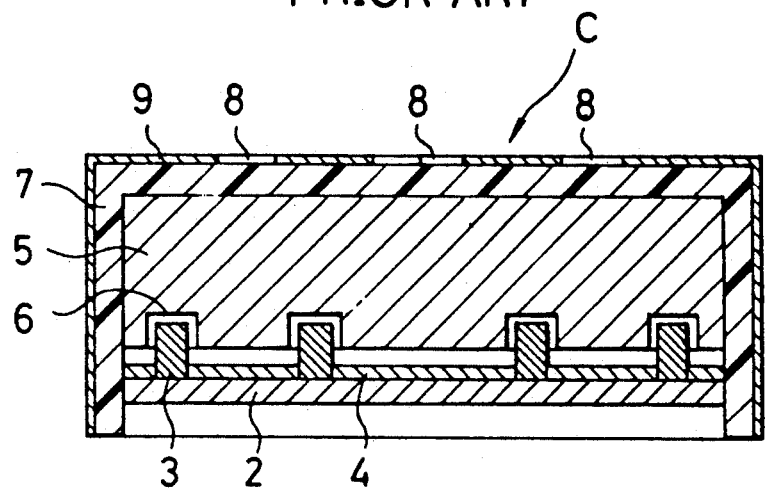
FIG. 5 is a vertical cross-sectional view showing a conventional optical display device.
Figure 6:
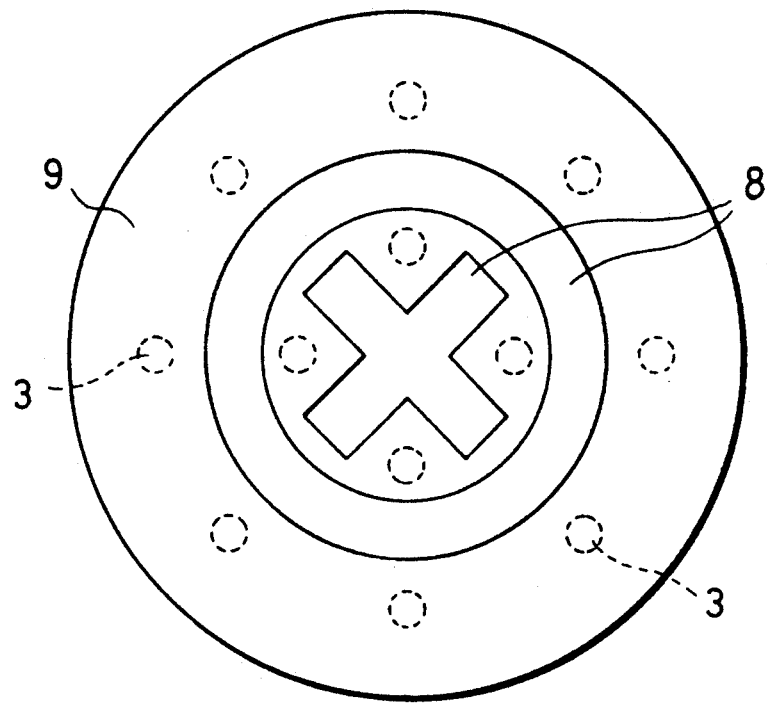
FIG. 6 is a plan view showing the device shown in FIG. 5.

In the embodiment shown, the same references are used to denote the same members or components as those in FIGS. 5 and 6.

An optical display device A includes a printed circuit board 2, light sources 3 provided on a top face of the printed circuit board 2, a light transmissive member 5A located above the printed circuit board 2 at a slight interval and made of acrylic resin or the like having a high light transmissive characteristic with cavities 6 being formed at positions corresponding to the front faces of the light sources 3, a light dispersing plate 12 formed intimately on the top surface of the light transmissive member 5A, a color sheet 11 having a light transmissive characteristic and formed intimately on the top surface of the light dispersing plate 12, a "half mirror" (through which part of light passes) provided intimately on the top surface of the color sheet 11, a light reflective surface 4A applied to the lower surface of the light transmissive member 5A, and a box-like member 7 arranged so as to cover the front face and side surfaces of the light transmissive member 5A and side surfaces of the printed circuit board 2 and made of acrylic resin or the like having a high light transmissive characteristic. A non-transparent coating film or a plate film 9 is applied to the surface of the box-like member 7 except for the light display portion 8 defining a desired pattern.

The light dispersing plate 12 may be a plate or film made of semitransparent resin made by applying fine corrugations sandblasted on one surface of a thin plate or a film made of transparent material through which the light from the light sources 3 passes so that the light is irregularly reflected and dispersed, or otherwise a milky white plate or film made of material having a high light transmissive characteristic by diffusing white fine pigment powders into the interior of the may be used.

The color sheet 11 is a transparent thin film colored in a single color or a plurality of colors. The color sheet 11 is arranged corresponding to the display pattern of the optical display device A. The light reflective surface 4A is made by forming lines (or dots) on the rear surface of the transmissive member 5A by a screen print with ink having a high light reflectivity as shown in U.S. Pat. No. 5,057,974. The lines are distributed so that the line density becomes higher as the distance from the light sources 3 is longer. Namely, the lines are distributed so that the line density per a unit area is increased by changing a width of the lines or spaces between the lines so that the light from the light sources 3 is reflected toward the color sheet 11 as reflective light having a uniform distribution. Incidentally, the light dispersing plate 12 is not limited to that shown and, it is possible to substitute a formation of a number of fine corrugations on the upper surface of the light transmissive member 5A.

The thus constructed optical display device A displays the display pattern by reflecting sunshine on the half mirror 10 to exhibit the sign or figure in a silver metallic color in the daytime. In the nighttime, the current is supplied to lighting circuits of the light sources to light the light sources 3. The light from the light sources 3 is advanced from the end faces of the cavities of the transmissive member 5A through the transmissive member 5A. On the other hand, a part of the light is effectively reflected by the reflective surface 4A and is advanced toward the upper surface of the transmissive member 5A. The light which has reached the upper surface of the transmissive member 5A becomes light uniform over the entire surface by the action of the light dispersing plate 12. If the display portion 8 of the boxy member 7 is composed of a letter and a sign, and the letter and the sign are displayed in colors, it is possible to make the display more remarkable by forming the color sheet in the desired colors.

Figure 1:
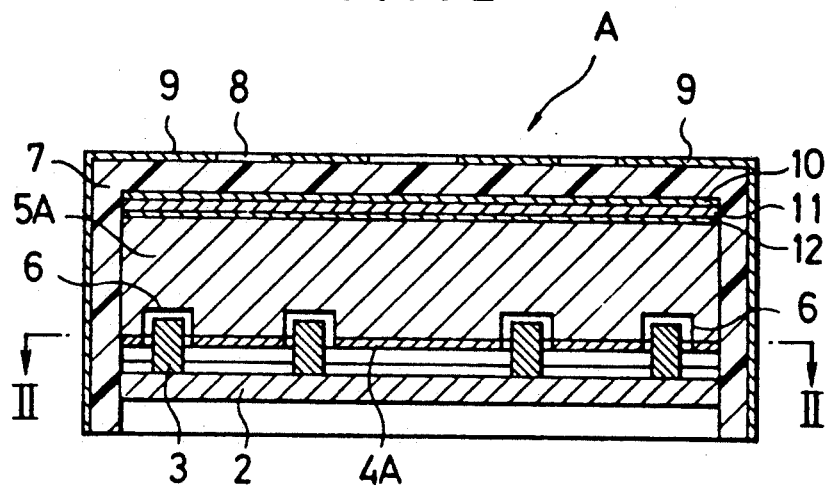
FIG. 1 is a vertical cross-sectional view showing an optical display device in accordance with a first embodiment of the invention.
Figure 2:
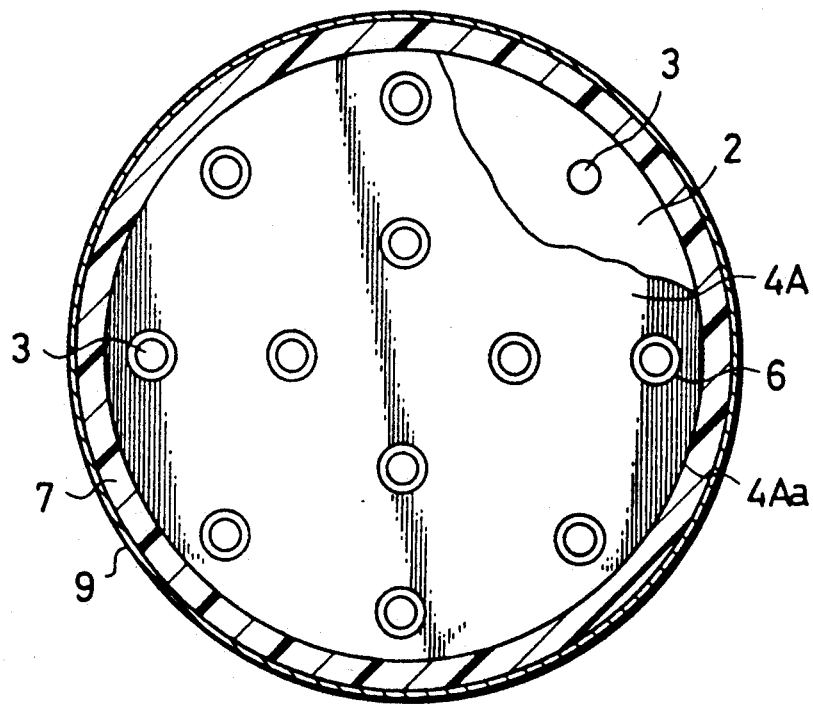
FIG. 2 is a cross-sectional view taken along the line II—II of FIG. 1.
Figure 3:
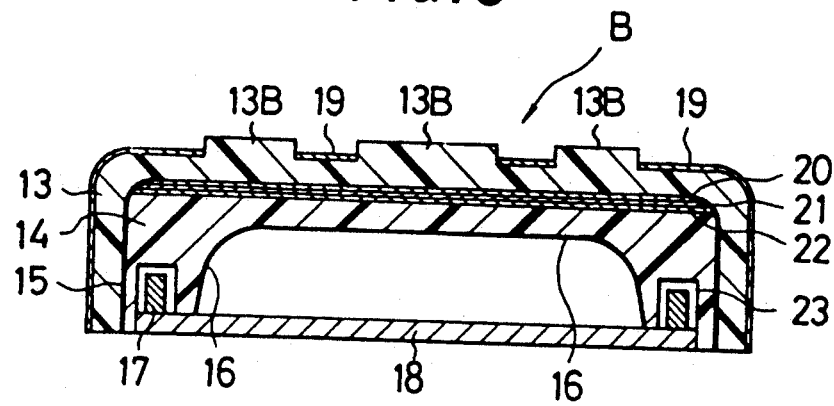
FIG. 3 is a vertical cross-sectional view showing an optical display device in accordance with a second embodiment of the invention.
Figure 4:
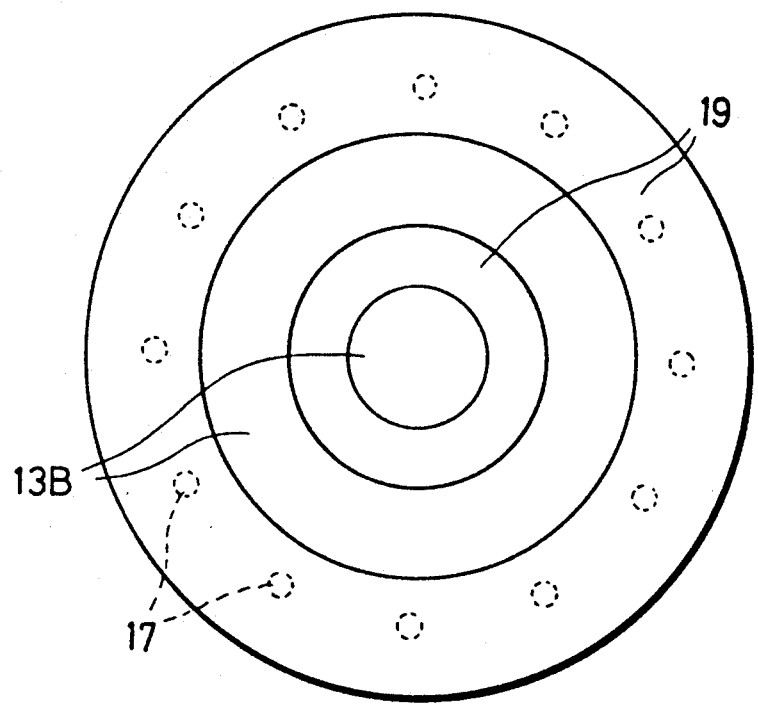
FIG. 4 is a plan view of the device shown in FIG. 3.

A second embodiment of the invention will not be described with reference to FIGS. 3 and 4.

Reference numeral 17 denotes LEDs mounted in a peripheral portion of the optical display device, and reference numeral 14 denotes a transparent member made of transparent material such as acrylic resin or glass with an inverted U-shape in cross section. In the same manner as the first embodiment, the light dispersing plate 22, the color sheet 21 and the half mirror 20 are intimately formed on the upper surface of the transmissive member 14. These components are covered by a box-like member 13 made of material having a high light transmissive characteristic such as acrylic resin located on the upper surface of the half mirror 20. The upper surface of the box-like member 13 is covered by non-transmissive coatings 19 or the like except for the pattern display portions 13B. In the transmissive member 14, except for the light sources 17, the light passing through the light transmissive member 14 is not leaked from the light transmissive member 14, and the reflective surfaces 15 and 16 are formed for introducing the light into the light display portions 13B. The reflective surfaces 15 and 16 have the lines or dots in the same manner as in the first embodiment but their details will be omitted.

In the daytime, the thus constructed optical display device B highlights the light display portions 13B with a high brightness in a silver metallic color by reflecting the sunshine n the half mirror. Also, the color sheet 21 is arranged so that the interior of the optical display device B is not observed from the outside.

On the other hand, when the light sources 17 such as LEDS is turned on in the nighttime, the light from the light sources 17 is advanced through the light transmissive member 14 while reflecting between the reflective surfaces 15 and 16 and the pattern to be displayed is exhibited from the light display portions 13B to the outside, so that the pattern can be read.

It is apparent that the invention is not limited to those embodiments shown but the person skilled in the art may modify the above described embodiments. For example, in the first and second embodiment, the color sheet 11, 21 is intimately formed on the top surface of the light dispersing plate 12, 22. However, it is possible to provide the light dispersing film 12, 22 on the top surface of the color sheet 11, 21.

The optical display device according to the present invention is simple in structure in comparison with the prior art device According to the invention, it is possible to reduce a thickness of the transmissive member and hence the thickness of the overall device. Since the half mirror plate is used, it is possible to keep the internal instruments of the display device invisible from the outside

What is claimed is:

1. An optical display device comprising:
   a printed circuit board;
   light sources mounted on said printed circuit board;
   a light transmissive member having at a bottom a light reflective surface for reflecting light upwardly, cavities into which said light sources are inserted being formed in said light transmissive member, said light transmissive member being made of light transmissive material;
   a light dispersing plate provided on an upper surface side of said light transmissive member for dispersing light from the light sources;
   a color sheet provided on an upper surface side of said light dispersing plate;
   a half mirror provided on an upper surface side of said color sheet; and
   a light display member provided on an upper surface side of said half mirror for displaying a predetermined pattern.

2. An optical display device comprising:
   a printed circuit board;
   light sources mounted on said printed circuit board;
   a light transmissive member having at an upper surface a light dispersing area and at a bottom a light reflective surface for reflecting light upwardly, cavities into which said light source are inserted being formed in said light transmissive member, said light transmissive member being made of light transmissive material;
   a color sheet provided on an upper surface side of said light transmissive member;
   a half mirror provided on an upper surface side of said color sheet; and
   a light display member provided on an upper surface side of said half mirror for displaying a predetermined pattern.

* * * * *